(12) United States Patent
Yang et al.

(10) Patent No.: US 8,760,897 B2
(45) Date of Patent: Jun. 24, 2014

(54) DC-AC CONVERTER AND CONVERSION CIRCUIT

(75) Inventors: Ming-Che Yang, Taichung (TW);
Pao-Chuan Lin, Zhubei (TW); Po-Yen Chen, Taipei (TW); Ching-Tsa Pan, Hsinchu (TW); Yeh-Hsiang Ho, Jhongpu Township, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 189 days.

(21) Appl. No.: 13/455,758

(22) Filed: Apr. 25, 2012

(65) Prior Publication Data

US 2013/0148383 A1    Jun. 13, 2013

(30) Foreign Application Priority Data

Dec. 12, 2011    (TW) .............................. 100145853 A (51) Int. Cl.
*H02M 7/537* (2006.01)
*G05F 1/00* (2006.01)

(52) U.S. Cl.
USPC ........................................ 363/131; 323/266

(58) Field of Classification Search
CPC ....... H02M 7/42; H02M 7/48; H02M 7/5381; H02M 3/005; H02M 3/33523; H02M 2001/007
USPC ................. 363/15–17, 24–26, 34, 40–41, 55, 363/56.01–56.02, 95, 97–98, 109, 363/131–132; 323/205, 207, 266
See application file for complete search history.

(56) References Cited

U.S. PATENT DOCUMENTS

| | | | | |
|---|---|---|---|---|
| 4,257,087 A | * | 3/1981 | Cuk | 363/16 |
| 5,416,387 A | * | 5/1995 | Cuk et al. | 315/209 R |
| 5,442,539 A | * | 8/1995 | Cuk et al. | 363/89 |
| 5,642,267 A | * | 6/1997 | Brkovic et al. | 363/16 |
| 6,115,267 A | * | 9/2000 | Herbert | 363/25 |

(Continued)

FOREIGN PATENT DOCUMENTS

| | | |
|---|---|---|
| CN | 101478253 | 7/2009 |
| TW | 200807859 | 2/2008 |
| WO | WO 2007080429 A2 * | 7/2007 |

OTHER PUBLICATIONS

English language translation of abstract of TW 200807859 (published Feb. 1, 2008).

(Continued)

*Primary Examiner* — Timothy J Dole
*Assistant Examiner* — Ivan Laboy Andino
(74) *Attorney, Agent, or Firm* — McClure, Qualey & Rodack, LLP (57) ABSTRACT

A DC-AC converter is provided. The DC-AC converter includes a time-varying DC power generating circuit, an AC power generating circuit and a transmission capacitor. The time-varying DC power generating circuit is controlled by a pulse width modulation (PWM) signal to transform a DC source into a time-varying DC power. With reference to the time-varying DC power, the AC power generating circuit is controlled by a first polarity switching and a second polarity switching signal to generate an AC power. The transmission capacitor, coupled to the time-varying DC power generating circuit and the AC power generating circuit, transmits the time-varying DC power from the time-varying DC generating circuit to the AC power generating circuit.

15 Claims, 7 Drawing Sheets

(56) References Cited

U.S. PATENT DOCUMENTS

| | | | |
|---|---|---|---|
| 6,195,273 B1 * | 2/2001 | Shteynberg | 363/26 |
| 6,781,351 B2 * | 8/2004 | Mednik et al. | 323/222 |
| 6,963,497 B1 * | 11/2005 | Herbert | 363/25 |
| 7,330,366 B2 | 2/2008 | Lee et al. | |
| 8,076,920 B1 * | 12/2011 | Melanson | 323/299 |
| 8,493,751 B2 * | 7/2013 | Schlecht | 363/21.06 |
| 2004/0232898 A1 | 11/2004 | Morris et al. | |
| 2010/0054001 A1 * | 3/2010 | Dyer et al. | 363/21.17 |
| 2012/0290145 A1 * | 11/2012 | Joshi et al. | 700/298 |
| 2013/0088211 A1 * | 4/2013 | Radtke | 323/282 |

OTHER PUBLICATIONS

English language translation of abstract of CN 101478253 (published Jul. 8, 2009).

Tsai, M.T., et al.; "A Compact Topology for Single-Phase Line-Interactive UPS Using Small DC-Link Capacitor;" Electricity Monthly; vol. 17; 2007; pp. 1-23 (including an English language translation of the abstract).

"Line-Interactive UPS with High Input Power Factor and Low Harmonic Current;" Electricity Monthly; vol. 11; 2001; pp. 1-11 (including an English language translation of the abstract).

"Voltage-Controlled Interactive UPS;" Electricity Monthly; vol. 12; 2002; pp. 148-158 (including an English language translation of the abstract.

"A Compact Topology for Single-Phase Line-Interactive UPS Using Small DC-Link Capacitor;" Electricity Monthly; vol. 17; 2007; pp. 138-151 (including an English language translation of the abstract).

"Latest Power Electronic Conversion Technologies and Product Features;" Micro-Electronics; No. 188; 2001; pp. 1-12 (including English language translation of the abstract).

* cited by examiner

DC-AC CONVERTER AND CONVERSION CIRCUIT

This application claims the benefit of Taiwan application Serial No. 100,145,853, filed Dec. 12, 2011, the disclosure of which is incorporated by reference herein in its entirety.

BACKGROUND

1. Technical Field

The disclosed embodiments relate to a DC-AC converter and conversion circuit.

2. Description of the Related Art

In a conventional low-frequency isolated DC-AC converter, an output voltage of a post-stage AC inverter delivers the AC power required by a load through a transformer. A conventional low-frequency output transformer for such low-frequency isolated DC-AC converter is large in volume and has its output power limited by the output transformer.

In a conventional high-frequency isolated DC-AC converter, a DC-DC converter is generally implemented as a pre-stage circuit for controlling the DC link voltage, and energy is transmitted via a transformer to a secondary side through high-frequency switching. In the conventional high-frequency isolated DC-AC converter, a capacitor is connected in parallel of the secondary side for filtering and energy storage. An AC inverter as a post-stage circuit of the conventional high-frequency isolated DC-AC converter controls the output voltage and frequency. As the conventional high-frequency isolated DC-AC converter operates based on high-frequency switching, and loss resulted by the switching gets larger as the switching frequency increases, circuit conversion efficiency is degraded.

In a conventional isolated DC-AC converter, an output capacitor of a DC link as an energy buffer for post-stage AC inverter. Hence, as the output power increases, not only the size of the output capacitor of the DC link gets larger but also the circuit volume and cost are increased. Although a large-capacitance electrolyte capacitor is generally used as filtering component, the electrolyte capacitor yet suffers from a relatively shorter lifespan than other circuit components. Therefore, it is necessary for preventing the utilization of an electrolyte capacitor from as a component in a DC-AC converter to increase an overall operating lifespan of the DC-AC converter.

SUMMARY

The disclosure is directed to a DC-AC converter and a DC-AC conversion circuit.

According to one embodiment, a DC-AC converter is provided. The DC-AC converter includes a time-varying DC power generating circuit, an AC power generating circuit and a transmission capacitor. The time-varying DC power generating circuit is controlled by a pulse width modulation (PWM) signal to transform a DC source to a time-varying DC power. With reference to the time-varying DC power, the AC power generating circuit is controlled by a first polarity switching and a second polarity switching signal to generate an AC power. The transmission capacitor, coupled to the time-varying DC power generating circuit and the AC power generating circuit, transmits the time-varying DC power from the time-varying DC generating circuit to the AC power generating circuit.

According to another embodiment, a DC-AC conversion circuit is provided. The DC-AC conversion circuit includes a time-varying DC power generating circuit, an AC power generating circuit and a transmission capacitor. The time-varying DC power generating circuit is controlled by a PWM signal to transform a DC source to a time-varying DC power. With reference to the time-varying DC power, the AC power generating circuit is controlled by a first polarity switching and a second polarity switching signal to generate an AC power. The transmission capacitor, coupled to the time-varying DC power generating circuit and the AC power generating circuit, transmits the time-varying DC power from the time-varying DC generating circuit to the AC power generating circuit.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
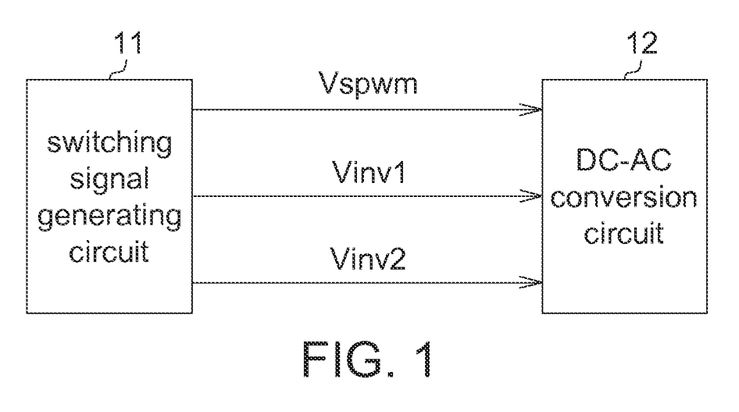
FIG. 1 is a block diagram of a DC-AC converter.
Figure 2:
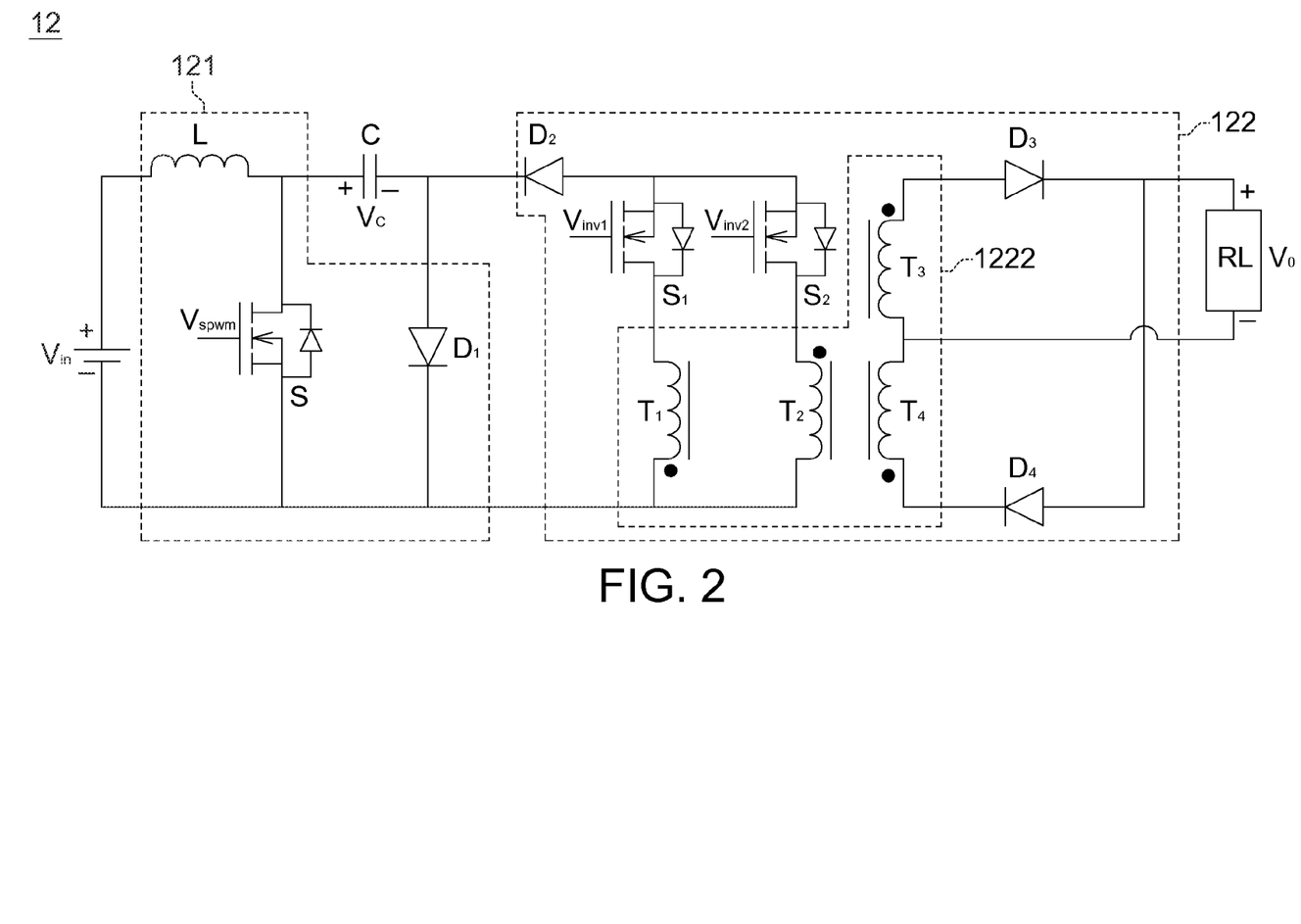
FIG. 2 is a schematic diagram of a DC-AC conversion circuit.
Figure 3:
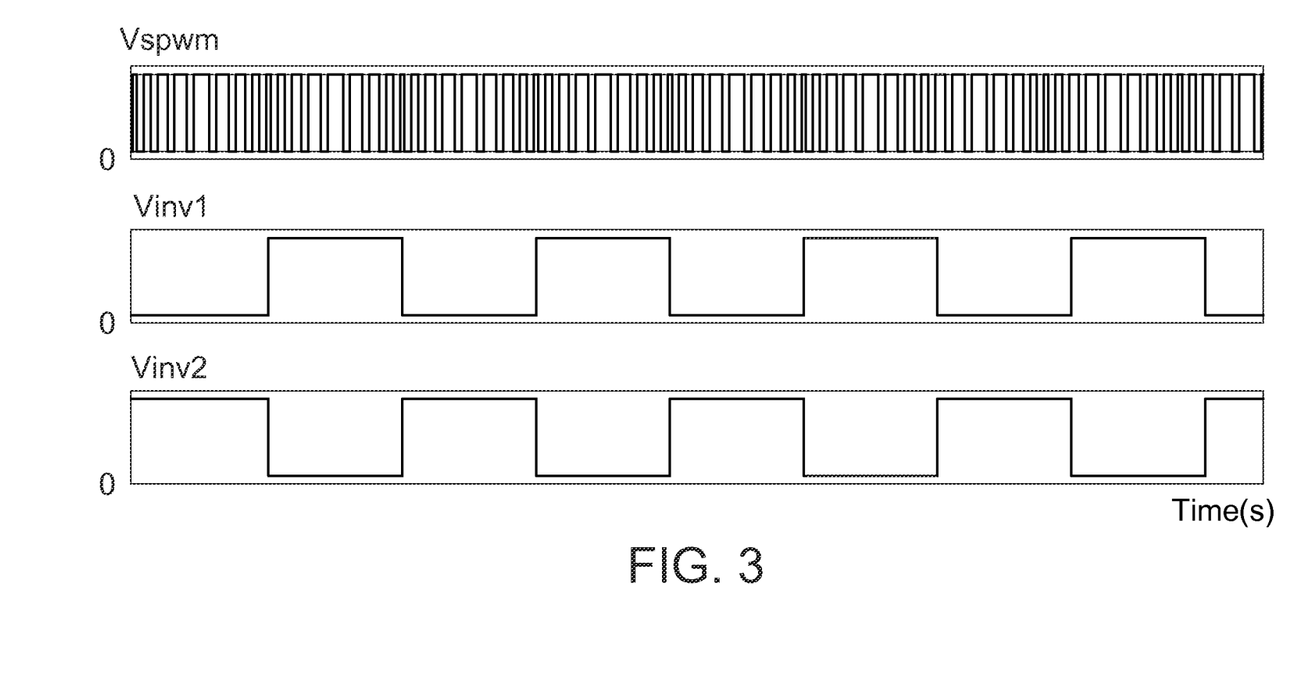
FIG. 3 is a time chart diagram of a pulse width modulation (PWM) signal and polarity switching signals.
Figure 4:
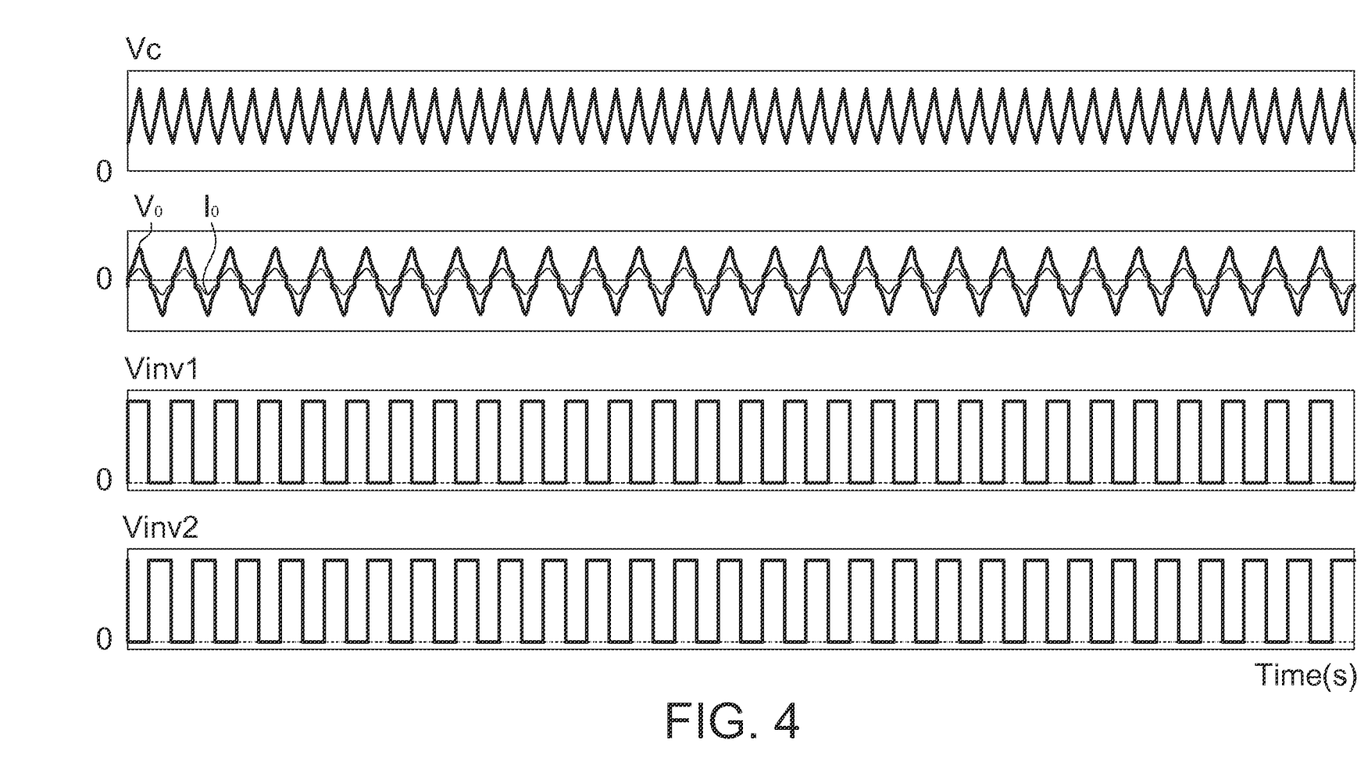
FIG. 4 is a time chart diagram of waveforms of a time-varying DC power, an AC power, a PWM signal and polarity switching signals.

The description below is given with reference to FIGS. 1 to 4. FIG. 1 shows a block diagram of a DC-AC converter; FIG. 2 shows a schematic diagram of a DC-AC conversion circuit; FIG. 3 shows a time chart diagram of a pulse width modulation (PWM) signal and polarity switching signals; FIG. 4 shows a time chart of waveforms of a time-varying DC power, an AC power, a PWM signal and polarity switching signals. A DC-AC converter 1 includes a switching signal generating circuit 11 and a DC-AC conversion circuit 12. The switching signal generating circuit 11 generates a PWM signal Vspwm, a polarity switching signal Vinv1 and a polarity switching signal Vinv2. According to the PWM signal Vspwm, the polarity switching signal Vinv1 and the polarity switching signal Vinv2, the DC-AC conversion circuit 12 transforms a DC source Vin to an AC power Vo and outputs the AC power Vo to a load RL.

The DC-AC conversion circuit 12 includes a time-varying DC power generating circuit 121, an AC power generating circuit 122 and a transmission capacitor C. The time-varying DC power generating circuit 121 is controlled by the PWM signal Vspwm to transform the DC source Vin to a time-varying DC power, so that a size of a transmission capacitor cross voltage Vc varies with time. The AC power generating circuit 122 obtains the time-varying DC power via the transmission capacitor cross voltage Vc. With reference to the time-varying DC power, the AC power generating circuit 122 is controlled by the polarity switching signals Vinv1 and Vinv2 to generate the AC power Vo. The transmission capacitor C, coupled to the time-varying DC power generating circuit 121 and the AC power generating circuit 122, transmits the time-varying DC power from the time-varying DC power generating circuit 121 to the AC power generating circuit 122. That is, the energy between the two circuits is transmitted via the transmission capacitor cross voltage Vc.

The time-varying DC power generating circuit 121 includes an inductor L, a PWM switch S and a first rectifying element D1. For example, the PWM switch is a transistor, an insulated gate bipolar transistor (IBGT), a silicon-controlled rectifier (SCR) or a gate turn-off thyristor (GTO). The PWM switch S modulates a waveform of the AC power Vo according to the PWM signal Vspwm. The inductor L has one terminal coupled to the DC source Vin and the other terminal coupled to an input of the transmission capacitor C. The PWM switch S is coupled to the other terminal of the inductor and the input of the transmission capacitor C. The first rectifying element D1 has a first terminal coupled to an output of the transmission capacitor C and a second terminal coupled to the PWM switch S.

The AC power generating circuit 122 includes a second rectifying element D2, a first polarity switch S1, a second polarity switch S2, a third rectifying element D3, a fourth rectifying element D4 and a transformer 1222. The first polarity switch S1 and the second polarity switch S2 respectively control the positive and negative polarity of the AC power Vo according to the polarity switching signals Vinv1 and Vinv2. For example, the first polarity switch S1 and the second polarity switch S2 are a transistor, an IGBT, an SCR or a GTO. For example, the first rectifying element D1, the second rectifying element D2, the third rectifying element D3 and the fourth rectifying element D4 are a diode, a metal-oxide-semiconductor field-effect transistor (MOSFET) or an IGBT. For example, a first terminal and a second terminal of each the first rectifying element D1, the second rectifying element D2, the third rectifying element D3 and the fourth rectifying element D4 are respectively an anode and a cathode.

The second rectifying element D2 has a second terminal coupled to the output of the transmission capacitor C, and has a first terminal coupled to the first polarity switch S1 and the second polarity switch S2. The third rectifying element D3 has a second terminal and the fourth rectifying element D4 has a first terminal coupled to the load RL. The transformer 1222 is coupled to the first polarity switch S1, the second polarity switch S2, the load RL, a second terminal of the fourth rectifying element D4 and a first terminal of the third rectifying element D3.

The transformer 1222 further includes a first coil T1, a second coil T2, a third coil T3 and a fourth coil T4. The first coil T1 has a first polarity terminal coupled to the second terminal of the first rectifying element D1, and a second polarity terminal coupled to the first polarity switch S1. In FIG. 2, the first polarity terminal is represented by a black dot. The second coil T2 has a first polarity terminal coupled to the second polarity switch S2, and a second polarity terminal coupled to the second terminal of the first rectifying element D1. The third coil T3 has a first polarity terminal coupled to the first terminal of the third rectifying element D3, and a second polarity terminal coupled to the load RL. The fourth coil T4 has a first polarity terminal coupled to the second terminal of the fourth rectifying element D4, and a second polarity terminal coupled to the third coil T3 and the load RL.

Figure 5:
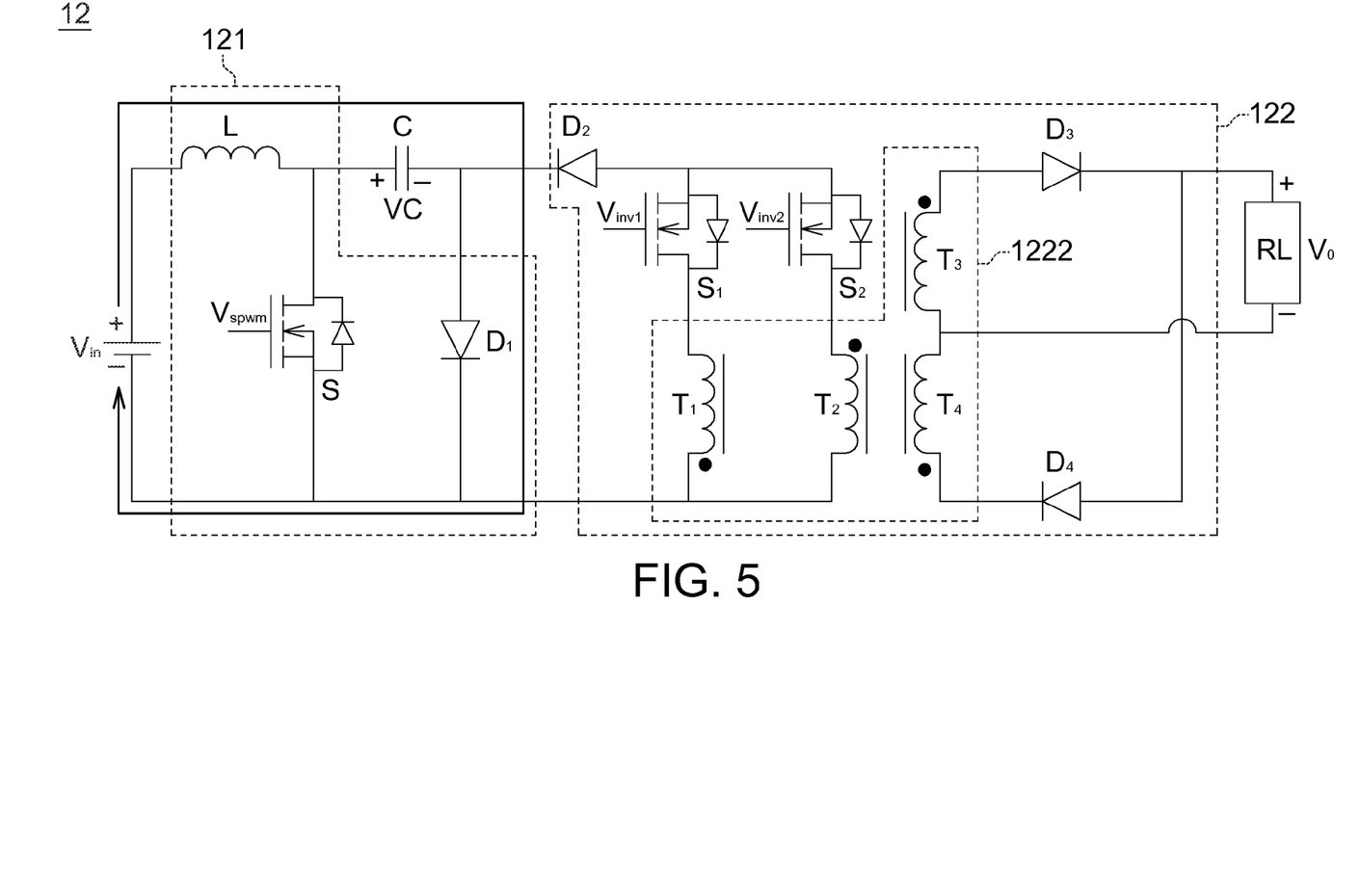
FIG. 5 is a schematic diagram of a DC-AC conversion circuit performing DC conversion.

FIG. 5 shows a schematic diagram of the DC-AC conversion circuit performing DC conversion. When the DC-AC conversion circuit 12 performs DC conversion, the PWM switch S is turned off, and a current loop is formed by the DC source Vin, the inductor L, the transmission capacitor C and the first rectifying element D1.

Figure 6:
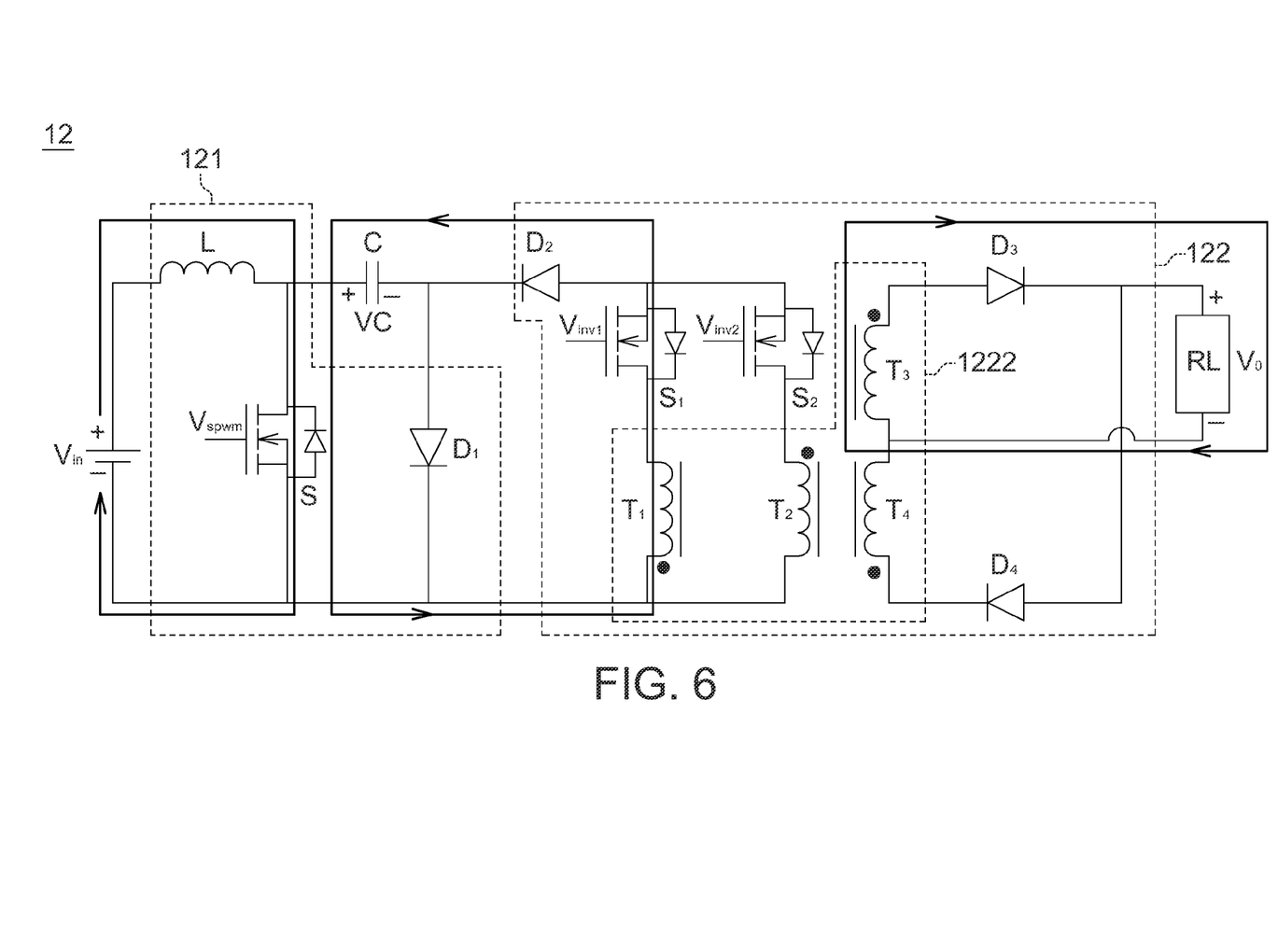
FIG. 6 is another schematic diagram of a DC-AC conversion circuit performing AC conversion.

FIG. 6 shows a schematic diagram of the DC-AC conversion circuit performing AC conversion. When the DC-AC conversion circuit 12 performs AC conversion, the PWM switch S is turned on, and a current loop is formed by the DC source Vin, the inductor L and the PWM switch S. The PWM switch S, the transmission capacitor C, the second rectifying element D2, the first polarity switch S1 and the first coil T1 form another current loop. The third coil T3, the third rectifying element D3 and the load RL also form a current loop, and the AC power Vo having a positive polarity is generated at the load RL.

Figure 7:
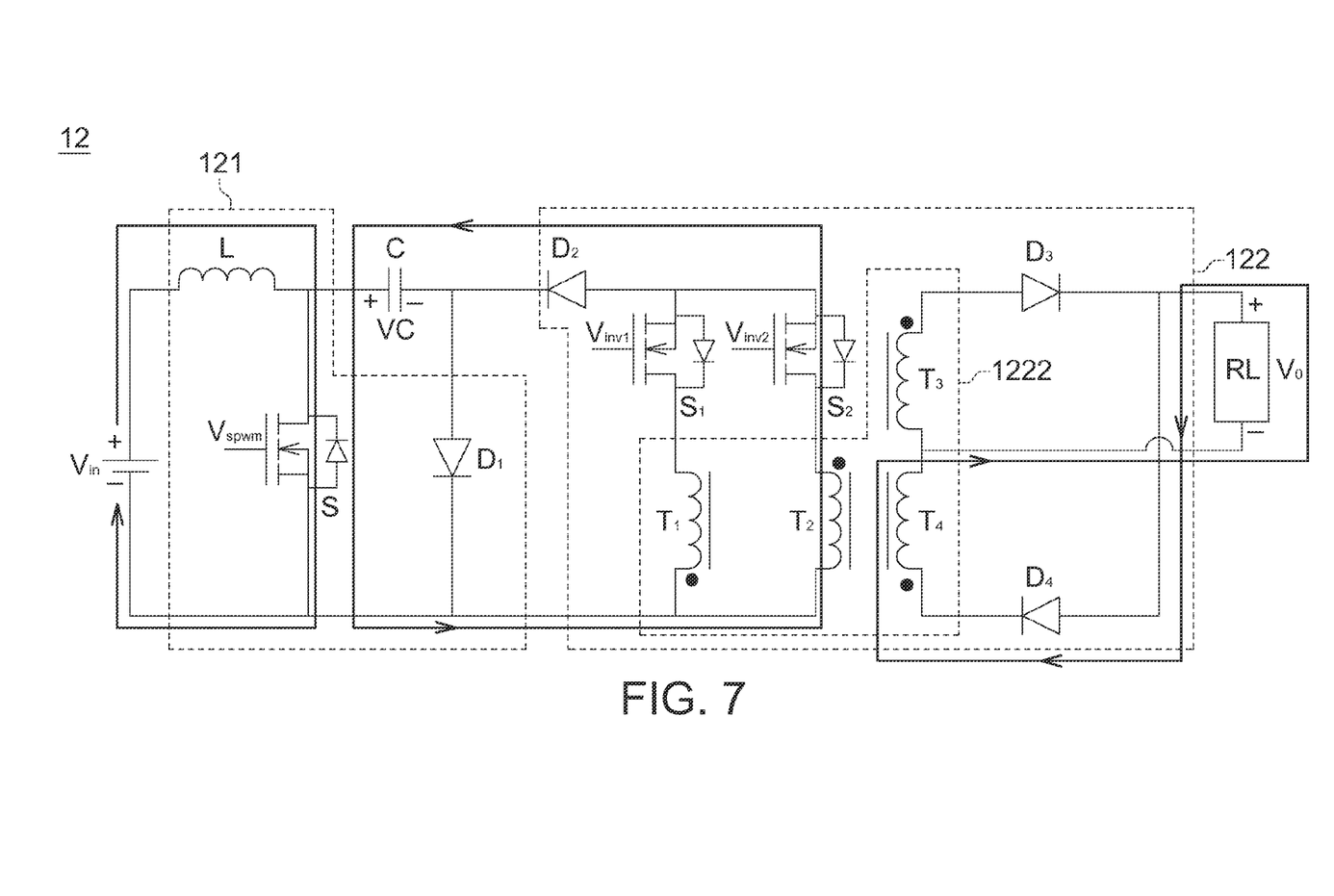
FIG. 7 is yet another schematic diagram of a DC-AC conversion circuit performing AC conversion.

FIG. 7 shows another schematic diagram of the DC-AC conversion circuit performing AC conversion. When the DC-AC conversion circuit 12 performs AC conversion, the PWM switch S is turned on, and a current loop is formed by the DC source Vin, the inductor L and the PWM switch S. The PWM switch S, the transmission capacitor C, the second rectifying element D2, the second polarity switch S2 and the second coil T2 form another current loop. The fourth coil T4, the fourth rectifying element D4 and the load RL also form a current loop, and the AC power Vo having a negative polarity is generated at the load RL.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A DC-AC converter, comprising:
   a time-varying DC power generating circuit, controlled by a pulse width modulation (PWM) signal to transform a DC source to a time-varying DC power;
   an AC power generating circuit, receiving the time-varying DC power and being controlled by a first polarity switching signal and a second polarity switching signal to generate an AC power; and
   a transmission capacitor, coupled to the time-varying DC power generating circuit and the AC power generating circuit, for transmitting the time-varying DC power from the time-varying DC power generating circuit to the AC power generating circuit;
   wherein
   the time-varying DC power generating circuit comprises:
   an inductor, having one terminal coupled to the DC source and one other terminal coupled to an input of the transmission capacitor;
   a PWM switch, coupled to the one other terminal of the inductor and the input of the transmission capacitor; and
   a first rectifying element, having a first terminal coupled to an output of the transmission capacitor and a second terminal coupled to the PWM switch; and
   the AC power generating circuit comprises:
   a second rectifying element, having a second terminal coupled to the output of the transmission capacitor;
   a first polarity switch, coupled to a first terminal of the second rectifying element;
   a second polarity switch, coupled to the first terminal of the second rectifying Element;
   a third rectifying element, having a second terminal coupled to a load; and
   a fourth rectifying element, having a first terminal coupled to the load;
   a transformer is coupled to the first polarity switch, the second polarity switch, the load, a second terminal of the fourth rectifying element and a first terminal of the third rectifying element.

2. The DC-AC converter according to claim 1, further comprising:
a switching signal generating circuit, for generating the PWM signal, the first polarity switching signal and the second polarity switching signal.

3. The DC-AC converter according to claim 1, wherein the transformer comprises:
a first coil, having a first polarity terminal coupled to the second terminal of the first rectifying element and a second polarity terminal coupled to the first polarity switch;
a second coil, having a first polarity terminal coupled to the second polarity switch and a second polarity terminal coupled to the second terminal of the first rectifying element;
a third coil, having a first polarity terminal coupled to the first terminal of the third rectifying element and a second polarity terminal coupled to the load; and
a fourth coil, having a first polarity terminal coupled to the second terminal of the fourth rectifying element and a second polarity terminal coupled to the third coil and the load.

4. The DC-AC converter according to claim 1, wherein the first polarity switch and the second polarity switch respectively control the positive and negative polarity of the AC power according to the first polarity switching signal and the second polarity switching signal.

5. The DC-AC converter according to claim 1, wherein the first polarity switch and the second switch are a transistor, an insulated gate bipolar transistor (IGBT), a silicon-controlled rectifier (SCR) or a gate turn-off thyristor (GTO).

6. The DC-AC converter according to claim 1, wherein the first rectifying element, the second rectifying element, the third rectifying element and the fourth rectifying element are a metal-oxide-semiconductor field-effect transistor (MOSFET) or an IGBT.

7. The DC-AC converter according to claim 1, wherein the PWM switch is a transistor, an IGBT, an SCR or a GTO.

8. The DC-AC converter according to claim 1, wherein the PWM switch modulates a waveform of the AC power according to the PWM signal.

9. A DC-AC conversion circuit, comprising:
a time-varying DC power generating circuit, for generating a time-varying DC power according to a PWM signal;
an AC power generating circuit, receiving the time-varying DC power and being controlled by a first polarity switching signal and a second polarity switching signal to output an AC power; and
a transmission capacitor, coupled to the time-varying DC power generating circuit and the AC power generating circuit, for transmitting the time-varying DC power from the time-varying DC power generating circuit to the AC power generating circuit;
wherein
the time-varying DC power generating circuit comprises:
an inductor, having one terminal coupled to a DC source and one other terminal coupled to an input of the transmission capacitor;
a PWM switch, coupled to the one other terminal of the inductor and the input of the transmission capacitor; and
a first rectifying element, having a first terminal coupled to an output of the transmission capacitor and a second terminal coupled to the PWM switch; and
the AC power generating circuit comprises:
a second rectifying element, having a second terminal coupled to the output of the transmission capacitor;
a first polarity switch, coupled to a first terminal of the second rectifying element;
a second polarity switch, coupled to the first terminal of the second rectifying Element;
a third rectifying element, having a second terminal coupled to a load; and
a fourth rectifying element, having a first terminal coupled to the load;
a transformer is coupled to the first polarity switch, the second polarity switch, the load, a second terminal of the fourth rectifying element and a first terminal of the third rectifying element.

10. The DC-AC conversion circuit according to claim 9, wherein the transformer comprises:
a first coil, having a first polarity terminal coupled to the second terminal of the first rectifying element and a second polarity terminal coupled to the first polarity switch;
a second coil, having a first polarity terminal coupled to the second polarity switch and a second polarity terminal coupled to the second terminal of the first rectifying element;
a third coil, having a first polarity terminal coupled to the first terminal of the third rectifying element and a second polarity terminal coupled to the load; and
a fourth coil, having a first polarity terminal coupled to the second terminal of the fourth rectifying element and a second polarity terminal coupled to the third coil and the load.

11. The DC-AC conversion circuit according to claim 9, wherein the first polarity switch and the second polarity switch respectively control the polarity and negative polarity of the AC power according to the first polarity switching signal and the second polarity switching signal.

12. The DC-AC conversion circuit according to claim 9, wherein the first polarity switch and the second polarity switch are a transistor, an IGBT, an SCR or a GTO.

13. The DC-AC conversion circuit according to claim 9, wherein the first rectifying element, the second rectifying element, the third rectifying element and the fourth rectifying element are a MOSFET or an IGBT.

14. The DC-AC conversion circuit according to claim 9, wherein the PWM switch is a transistor, an IGBT, an SCR or a GTO.

15. The DC-AC conversion circuit according to claim 9, wherein the PWM switch modulates a waveform of the AC power according to the PWM signal.

* * * * *